United States Patent [19]

Yamada et al.

[11] 4,281,893
[45] Aug. 4, 1981

[54] SUPER WIDE BAND LIGHT TRANSMITTING SYSTEM

[75] Inventors: Ryozo Yamada, Hamamatsu; Naomichi Okamoto, Kami; Toshimi Meiri, Hamamatsu, all of Japan

[73] Assignee: President Shizuoka University, Shizuoka Pref., Japan

[21] Appl. No.: 75,185

[22] Filed: Sep. 13, 1979

[30] Foreign Application Priority Data

Sep. 29, 1978 [JP] Japan ................. 53-120979

[51] Int. Cl.³ ................................. G02B 5/14
[52] U.S. Cl. .......................... 350/96.31; 350/96.15; 350/162 SF; 350/311
[58] Field of Search ............... 350/96.15, 96.16, 96.17, 350/96.20, 96.30, 96.31, 162 SF, 311, 314, 315

[56] References Cited

U.S. PATENT DOCUMENTS

| | | | |
|---|---|---|---|
| 3,643,097 | 2/1972 | Ueki et al. .................. | 350/96.31 X |
| 3,891,302 | 6/1975 | Dabby et al. ................. | 350/96.30 X |
| 4,176,911 | 12/1979 | Marcatili et al. .............. | 350/96.31 |
| 4,229,067 | 10/1980 | Love ........................... | 350/96.15 |

FOREIGN PATENT DOCUMENTS

| | | | |
|---|---|---|---|
| 52-32341 | 3/1977 | Japan ......................... | 350/96.15 |
| 1390108 | 4/1975 | United Kingdom ......... | 350/96.30 |

OTHER PUBLICATIONS

Gloge, "Weakly Guiding Fibers," *Applied Optics*, vol. 10, No. 10, Oct. 1971, pp. 2252-2258.
Okamoto et al., "Analysis of Wave Propagation in Optical Fibers ...," *IEEE Trans. on M'Wave Th. & Tech.*, vol. MTT-24, No. 7, Jul. 1976, pp. 416-421.
Yamada et al., "Guided Waves Along an Optical Fiber ...," *J.O.S.A.*, vol. 67, No. 1, Jan. 1977, pp. 96-103.
Snitzer, "Cylindrical Dielectric Waveguide Modes," *J.O.S.A.*, vol. 51, No. 5, May 1961, pp. 491-498.

*Primary Examiner*—John K. Corbin
*Assistant Examiner*—John D. Lee
*Attorney, Agent, or Firm*—Stevens, Davis, Miller & Mosher

[57] ABSTRACT

There is inserted between a light source and an input of an optical fiber a mode filter which changes the phase of light to be propagated continuously or discontinuously so as to convert guided modes of lower azimuthal number into those of higher numbers in a light transmitting system which employs a graded index optical fiber with a valley at the core-cladding boundary. This reduces the mode-delay differences for all modes including those which are close to cut off so that an optical communication system having a very wide bandwidth is obtained.

5 Claims, 18 Drawing Figures

Dielectric Constant Profiles of Inhomogeneous Optical Fibers

Dielectric Constant Profiles of Inhomogeneous Optical Fibers

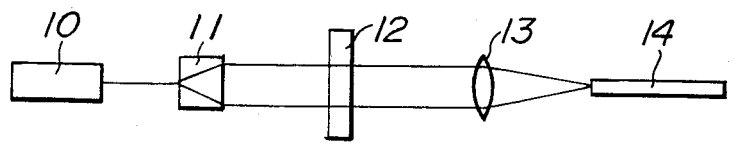
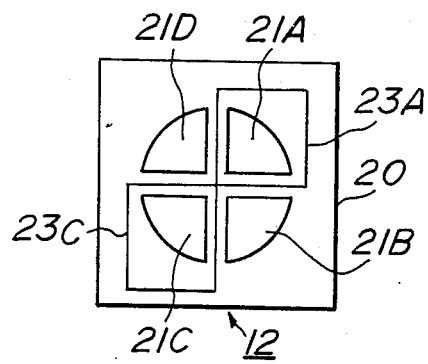
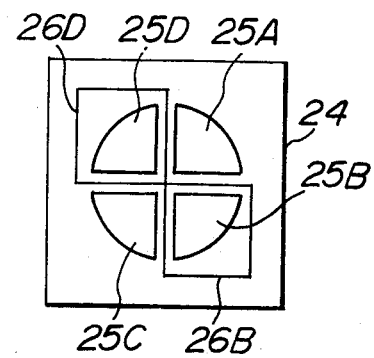
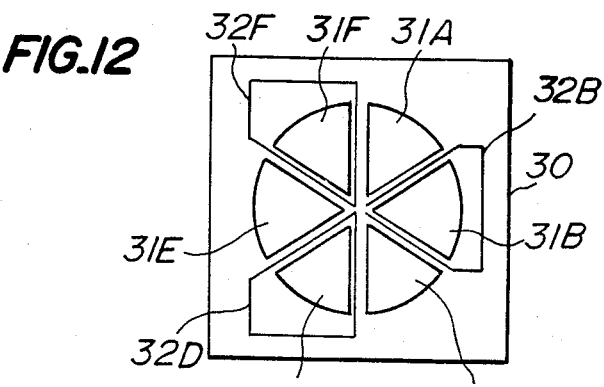
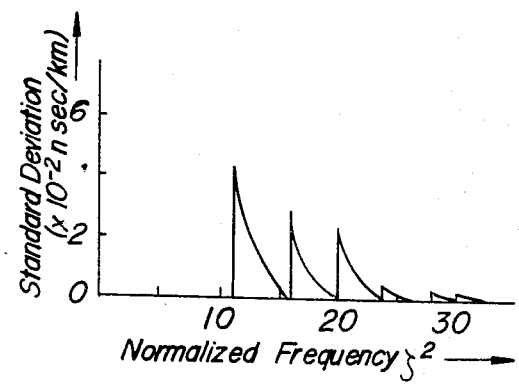

SUPER WIDE BAND LIGHT TRANSMITTING SYSTEM

BACKGROUND OF THE INVENTION

The present invention relates to a light transmitting system using a graded index optical fiber comprising a core in which dielectric constant continuously decreases from its center along its radius and a cladding which has a uniform dielectric constant larger than that of the core at its interface with the cladding.

As information to be transmitted increases, a light transmitting system, which can transmit through an optical fiber a large amount of information with low loss of energy, has become more and more attractive so that various optical fibers have been developed and improved in various points and some optical fibers have already become available for practical applications.

The optical fiber which was developed first is a so-called step index optical fiber comprising a core 1 having a uniform dielectric constant $\epsilon_1$ therein and a cladding 2 having a uniform and lower dielectric constant $\epsilon_2$ as shown in FIG. 1. The entire distribution of dielectric constant is step-shaped as shown in FIG. 2. In this FIG. 2, the abscissa shows distances from the center of the core 1 in a direction of radius and the ordinate shows dielectric constant. This step index optical fiber, however, cannot have a wide bandwidth because the so-called dispersion is very large. In order to avoid such a defect, the development is made for a so-called graded index optical fiber comprising a core in which a dielectric constant decreases gradually from its center along its radius as shown in FIG. 3. It is known that the transmission characteristics of such a graded index optical fiber are superior to those of a step index optical fiber. A large factor which determines the bandwidth available for transmission through an optical fiber is the distortion of signal caused by group-delay differences among many modes on account of various dispersions. Such dispersion involve material dispersion, waveguide dispersion and multimode dispersion, in which the last-mentioned multimode dispersion affects seriously to a light transmission system through a multimode fiber. To investigate a method for lessening this multimode dispersion, it is necessary to analyze guided modes propagated through an optical fiber. However, the analysis of guided modes through a graded index fiber is so complicated that any rigorous analytical solution cannot be obtained. Therefore, we must be satisfied with a good approximate solution which can be obtained by a numerical and/or theoretical analysis. For example, one of such a theoretical analysis is described in "Journal of the Optical Society of America", Vol. 67, No. 1, pp. 96 to 103.

From such studies a proposal has been made for a graded index fiber the core of which has a parabolic distribution of dielectric constant along its radius and the cladding of which has a uniform distribution thereof, with an arbitrary dielectric constant "step" or "valley" at the core-cladding boundary as shown in FIG. 4. It has been proved that such a graded index fiber is advantageous in the above described multimode dispersion. In this specification such a fiber is called a graded index optical fiber with a valley at the core-cladding boundary. A numerical analysis of guided modes through such a fiber is described in "IEEE Transactions on Microwave Theory and Techniques", (Vol. 1, MTT-24, No. 7, pp. 416 to 421.) There are shown four profiles of distribution of dielectric constant in FIGS. 3(a), (b), (c) and (d) shown in page 419 of this article. In FIGS. 4(a), (b), (c) and (d) of the article there are shown frequency-group delay characteristics with a parameter of guided modes. FIG. 5 of the accompanying drawings is a frequency-group delay characteristic for a graded index optical fiber with a valley at the core-cladding boundary shown in FIG. 4(d) of the above article. It will be seen from this FIG. 5 that there is only a small mode-delay difference in lower order modes such as of zero-th, first and second order as well as in higher order modes. However, the theoretical results by the present inventors have revealed that there are, in fact, a large mode-delay difference among the modes with lower azimuthal number. The result of FIG. 5 may have been probably obtained from an insufficient approximation in the numerical analysis. Thus, a sufficiently wide bandwidth cannot be obtained even through a graded index optical fiber with a valley at the core-cladding boundary, because such a fiber has a large group-delay difference among many modes, especially among modes with lower azimuthal numbers described above.

SUMMARY OF THE INVENTION

The object of the present invention is to provide a light transmitting system having a super wide bandwidth through the above described graded index optical fiber by eliminating modes with lower azimuthal numbers which may produce a large mode-delay difference.

To accomplish the object according to the present invention, a light transmitting system as described in the preamble is characterized in that there is provided a mode filter, between a laser producing $TEM_{00}$ wave and an input of said fiber, which eliminates modes with lower azimuthal numbers which produce large dispersion at a frequency close to a cut off frequency so that acid light transmitting system may have a super wide bandwidth by eliminating mode-delay differences.

BRIEF DESCRIPTION OF THE DRAWINGS

The invention will now be described by way of example with reference to the accompanying drawings.

FIG. 9 shows a schematic view of an embodiment of a light transmitting system using a mode filter according to the present invention;

FIG. 10 is a plan view of an embodiment of a mode filter used in the light transmitting system according to the present invention;

FIG. 11 is a plan view of an embodiment of a correcting filter of absorption used in combination with a mode filter of FIG. 10;

FIG. 12 is a plan view of another embodiment of a mode filter in the light transmitting system according to the present invention; and FIG. 13 shows a characteristic diagram of standard deviations of group delays plotted against normalized frequencies obtained by a light transmitting system using a mode filter according to the present invention.

DETAILED DESCRIPTION OF THE PREFERRED EMBODIMENT

At the outset, before explaining the light transmitting system according to the present invention, a mathematical treatment of guided modes along an optical fiber with parabolic profile of dielectric constant in a core surrounded by a cladding will be described.

Figure 6:
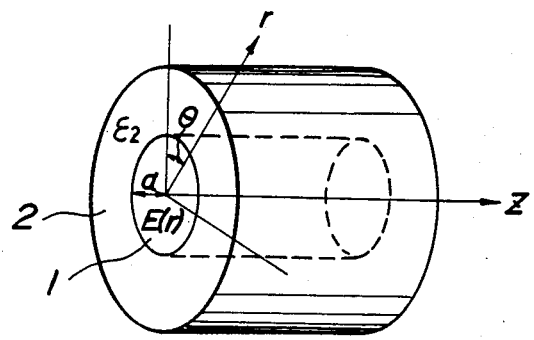
FIG. 6 is a schematic diagram illustrating a graded index fiber of FIG. 4.

Referring to FIG. 6, there is shown a segment of optical fiber in which dielectric constant $\epsilon(r)$ is distributed inhomogeneously in a direction of radius (r) but homogeneously in a direction of axis (z) in a core 1, while dielectric constant $\epsilon(r)$ is distributed homogeneously in both said directions in a cladding 2. More specifically, the distribution of dielectric constant in the core 1 has a parabolic index profile represented as follows.

$$\left. \begin{array}{l} \epsilon(r) = \epsilon_1(1 - \Delta r^2/a^2) \quad (r < a) \\ \epsilon(r) = \epsilon_2 \quad (r > a) \end{array} \right\} \quad (1)$$

where $\epsilon_1$, $\epsilon_2$ are the dielectric constants in the core 1 at its center and that of the cladding 2, respectively; and $\Delta$ is a parameter which defines a kind of sharpness of various parabolas. A constant $\delta$, which is a parameter representing a step of the dielectric constant at the core-cladding interface, is defined as follows;

$$\delta = [\epsilon_1(1-\Delta) - \epsilon_2]/\epsilon_2 \quad (2)$$

Figure 7A:
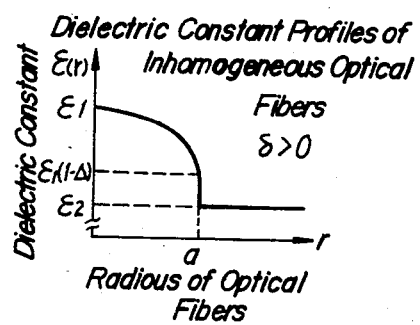
FIGS. 7(a), (b) and (c) show characteristic diagrams of distributions of dielectric constant in three graded index optical fibers, respectively.

In FIGS. 7(a), (b) and (c), there are shown three distributions of dielectric constant $\epsilon(r)$ for the cases of $\delta > 0$, $\delta = 0$ and $\delta < 0$, respectively. The profile shown in FIG. 7(c) represents the distribution in an optical fiber used in the present invention.

We consider an optical fiber with parabolic profile surrounded by a cladding. The vector wave equation in the fiber is $$\nabla \times (1/\epsilon) \Delta \times H = K^2 H \quad (3)$$

where $k^2 = \omega^2 \epsilon_0 \mu_0$ ($\epsilon_0$ = dielectric constant of vacuum; $\mu_0$ = space permeability, and time enters only through the factor $\exp j\omega t$.) If the transverse components (r, $\theta$ components) of the magnetic field are expressed as follows.

$$H_r = H_{nr} \sin(n\theta + \alpha) e^{-j\beta z} \quad (4\text{-a})$$

$$H_\theta = H_{n\theta} \cos(n\theta + \alpha) e^{-j\beta z} \quad (4\text{-b})$$

Equation (3) is transformed to a set of scalar wave equations in cylindrical coordinates:

$$\frac{1}{r} \frac{d}{dr}\left(r \frac{dH_{nr}}{dr}\right) + \left(k^2 \epsilon - \beta^2 - \frac{n^2 + 1}{r^2}\right) H_{nr} + \frac{2n}{r^2} H_{n\theta} = 0 \quad (5\text{-a})$$

$$\frac{1}{r} \frac{d}{dr}\left(r \frac{dH_{n\theta}}{dr}\right) + \left(k^2 \epsilon - \beta^2 - \frac{n^2 + 1}{r^2}\right) H_{n\theta} + \frac{2n}{r^2} H_{nr} - \frac{1}{\epsilon} \frac{d\epsilon}{dr}\left(\frac{dH_{n\theta}}{dr} - \frac{nH_{nr} - H_{n\theta}}{r}\right) = 0 \quad (5\text{-b})$$

where $\beta$ is a propagation constant for the light propagating along the axis of the fiber, i.e., in the direction of z. Taking the sum of difference of above (5-a) and (5-b), then next equations (6-a) and (6-b) will be given, respectively.

$$\left[\frac{1}{r} \frac{d}{dr}\left(r \frac{d}{dr}\right) + \left(k^2 \epsilon - \beta^2 - \frac{(n-1)^2}{r^2}\right)\right](H_{n\theta} + H_{nr}) - \frac{1}{\epsilon} \frac{d\epsilon}{dr}\left(\frac{dH_{n\theta}}{dr} - \frac{nH_{nr} - H_{n\theta}}{r}\right) = 0 \quad (6\text{-a})$$

$$\left[\frac{1}{r} \frac{d}{dr}\left(r \frac{d}{dr}\right) + \left(k^2 \epsilon - \beta^2 - \frac{(n+1)^2}{r^2}\right)\right](H_{n\theta} - H_{nr}) - \frac{1}{\epsilon} \frac{d\epsilon}{dr}\left(\frac{dH_{n\theta}}{dr} - \frac{nH_{nr} - H_{n\theta}}{r}\right) = 0 \quad (6\text{-b})$$

These two equations (6-a) and (6-b) may give an electromagnetic field for the mode with azimuthal number n in the core 1 and cladding 2.

First the electromagnetic field in the core 1 ($r < a$) will be derived. Here the dielectric constant $\epsilon(r)$ is a function of radius r in the core 1 such that no rigorous analytical solution can be obtained. However, an approximate solution is available which is useful in practical applications. Putting into (6-a) and (6-b) now parameters $\chi$, $\sigma$, $\lambda$ and variable x defined by $$\chi = 1 - \beta^2 / k^2 \epsilon_1 \quad (7)$$

$$\sigma = (\Delta/\epsilon_1)^{\frac{1}{2}}(1/ka) \quad (8)$$

$$\lambda = ka\chi(\epsilon_1/\Delta)^{\frac{1}{2}} = \chi/\sigma \quad (9)$$

$$x^2 = (k/a)(\epsilon_1 \Delta)^{\frac{1}{2}} r^2 \quad (10)$$

then next two equations are given:

$$\left[\frac{d}{dx}\left(x \frac{d}{dx}\right) + \left(\lambda x - x^3 - \frac{(n-1)^2}{x}\right)\right](H_{n\theta} + H_{nr}) + \frac{2\sigma x}{1 - \sigma x^2}\left(\frac{dH_{n\theta}}{dx} - \frac{nH_{nr} - H_{n\theta}}{x}\right) = 0 \quad (11\text{-a})$$

$$\left[\frac{d}{dx}\left(x \frac{d}{dx}\right) + \left(\lambda x + x^3 - \frac{(n+1)^2}{x}\right)\right](H_{n\theta} - H_{nr}) + \frac{2\sigma x}{1 - \sigma x^2}\left(\frac{dH_{n\theta}}{dx} - \frac{nH_{nr} - H_{n\theta}}{x}\right) = 0 \quad (11\text{-b})$$

In the above two equations (11-a) and (11-b), the parameter $\sigma$ is negligibly small so that these equations (11-a) and (11-b) will be transformed to two Laguerre's equations.

The zero-th order approximate solutions of the above equations are:

$$H_{n\theta} + H_{nr} = u_{2n\lambda} = (1/x)M_{a,b}(x^2) \quad (12\text{-a})$$

$$H_{n\theta} - H_{nr} = u_{1n\lambda} = (1/x)M_{a,c}(x^2) \quad (12\text{-b})$$

where M is the Whittaker function and $a=\lambda/4$, $b=(n-1)/2$, $c=(n+1)/2$. The above two items $u_{1n\lambda}$ and $u_{2n\lambda}$ are newly defined as described above. From the above two equations (12-a) and (12-b), together with Maxwell's equations, the zero-th order approximate electromagnetic field in the core 1 is obtained as follows;

$$H_{n\theta} = A_2 u_{2n\lambda} + A_1 u_{1n\lambda} \quad (13\text{-a})$$
$$H_{nr} = A_2 u_{2n\lambda} - A_1 u_{1n\lambda} \quad (13\text{-b})$$
$$H_z = -j \frac{\sigma^{\frac{1}{2}}}{(1-\chi)^{\frac{1}{2}}} (A_2 v_{2n\lambda} - A_1 v_{1n\lambda}) \sin(n\theta + \alpha) e^{-j\beta z} \quad (13\text{-c})$$
$$E_{n\theta} = \frac{-\eta_0}{(1-\sigma x^2)(1-\chi)^{\frac{1}{2}} \epsilon_1^{\frac{1}{2}}} ((1-\sigma x^2)(A_2 u_{2n\lambda} - A_1 u_{1n\lambda}) + \frac{n\sigma}{x}(A_2 v_{2n\lambda} + A_1 v_{1n\lambda})) \quad (13\text{-d})$$
$$E_{nr} = \frac{\eta_0}{(1-\sigma x^2)(1-\chi)^{\frac{1}{2}} \epsilon_1^{\frac{1}{2}}} ((1-\chi)(A_2 u_{2n\lambda} + A_1 u_{1n\lambda}) - \frac{n\sigma}{x}(A_2 v_{2n\lambda} - A_1 v_{1n\lambda})) \quad (13\text{-e})$$
$$E_z = \frac{-j\sigma^{\frac{1}{2}}\eta_0}{(1-\sigma x^2)\epsilon_1^{\frac{1}{2}}} (A_2 v_{2n\lambda} + A_1 v_{1n\lambda}) \cos(n\theta + \alpha) e^{-j\beta z} \quad (13\text{-f})$$

where $A_1$ and $A_2$ are coefficients, and $$\eta_0 = (\mu_0/\epsilon_0)^{\frac{1}{2}} \quad (14)$$

$$v_{1n\lambda} = \frac{du_{1n\lambda}}{dx} + \frac{n+1}{x} u_{1n\lambda} \quad (15\text{-a})$$

$$v_{2n\lambda} = \frac{du_{2n\lambda}}{dx} - \frac{n-1}{x} u_{2n\lambda} \quad (15\text{-b})$$

The electromagnetic field in the cladding 2 will then be derived. Here the dielectric constant $\epsilon(r)$ is not a function of radius r but a constant ($\epsilon = \epsilon_2$), so that its derivatives of first order are zero ($d\epsilon/dr=0$) anywhere. Therefore, said two equations (6-1) and (6-2) are written as;

$$\left[\frac{1}{r}\frac{d}{dr}\left(r\frac{d}{dr}\right) + \left\{k^2\epsilon_2 - \beta^2 - \frac{(n-1)^2}{r^2}\right\}\right] (H_{n\theta} + H_{nr}) = 0 \quad (16\text{-a})$$

$$\left[\frac{1}{r}\frac{d}{dr}\left(r\frac{d}{dr}\right) + \left\{k^2\epsilon_2 - \beta^2 - \frac{(n+1)^2}{r^2}\right\}\right] (H_{n\theta} - H_{nr}) = 0 \quad (16\text{-b})$$

Since these two equations (16-a) and (16-b) belong to modified Bessel functions, they can be analytically solved. From such solutions, together with Maxwell's equations, the electromagnetic field in the cladding 2 can be derived as follows;

$$H_{n\theta} = [CK_{n-1}(\Lambda r) + DK_{n+1}(\Lambda r)] \quad (17\text{-a})$$
$$H_{nr} = [CK_{n-1}(\Lambda r) - DK_{n+1}(\Lambda r)] \quad (17\text{-b})$$
$$H_z = j\frac{\Lambda}{\beta}(C - D)K_n(\Lambda r)\sin(n\theta + \alpha)e^{-j\beta z} \quad (17\text{-c})$$

$$E_n = \frac{-k^2}{\beta\omega\epsilon_0}(CK_{n-1}(\Lambda r) - DK_{n+1}(\Lambda r) - \frac{\Lambda}{k^2\epsilon_2}\frac{n}{r}(C + D)K_n(\Lambda r)) \quad (17\text{-d})$$

$$E_{nr} = \frac{\beta}{\omega\epsilon_0\epsilon_2}(CK_{n-1}(\Lambda r) + DK_{n+1}(\Lambda r) + \frac{\Lambda}{\beta^2}\frac{n}{r}(C - D)K_n(\Lambda r)) \quad (17\text{-e})$$

$$E_z = j\frac{\Lambda}{\omega\epsilon_0\epsilon_2}(C + D)K_n(\Lambda r)\cos(n\theta + \alpha)e^{-j\beta z} \quad (17\text{-f})$$

where K is the modified Bessel function of the second kind, and C and D are coefficients. $\Lambda$ is defined by $$\Lambda^2 = \beta^2 - k^2\epsilon_2 \quad (18)$$

Imposition of the boundary conditions at $r=a$, which requires the continuity of tangential components, leads to the equations for determining the relative amplitudes for the coefficients and the eigenvalue equation.

The eigenvalue equation is, for $n=0$, $$\eta_1 + \eta_3 = 0 \quad \text{for TE mode} \quad (19\text{-a})$$

$$(1+\delta)\eta_1 + \eta_3 = 0 \quad \text{for TM mode} \quad (19\text{-b})$$

For $n \geq 1$, $$-\frac{(1+\delta)\eta_1 + \eta_3}{\eta_2 + \eta_3} = \frac{(1+\delta)\eta_2 + \eta_4}{\eta_2 + \eta_4} \quad (19\text{-c})$$

where $$\eta_1 = \frac{u_{1n\lambda}(\zeta)}{\zeta v_{1n\lambda}(\zeta)}, \quad \eta_2 = \frac{u_{2n\lambda}(\zeta)}{\zeta v_{2n\lambda}(\zeta)} \quad (20\text{-a})$$

$$\eta_3 = \frac{K_{n+1}(\xi)}{\xi K_n(\xi)}, \quad \eta_4 = \frac{K_{n-1}(\xi)}{\xi K_n(\xi)} \quad (20\text{-b})$$

$$\zeta = x|_{r=a} = (ka)^{\frac{1}{2}}(\epsilon_1\Delta)^{\frac{1}{4}} \quad (21\text{-a})$$
$$\xi = \Lambda a \quad (21\text{-b})$$

With the help of equations (2), (12) and (21), $\xi$ is represented in terms of $\lambda$, $\zeta$ as $$\xi^2 = \frac{\delta + \Delta}{1 + \delta} \frac{\zeta^4}{\Delta} - \lambda\zeta^2 \quad (22)$$

Using recurrence formula and differential formula of Whittaker function, next relationship between $\eta_1$ and $\eta_2$ is derived.

$$\eta_1 = \frac{\lambda\zeta^2\eta_2 + 2n}{\zeta^2(\lambda + 2n\zeta^2\eta_2)} \quad (23)$$

Similarly, using recurrence formula of modified Bessel function of the second kind, next relationship between $\eta_3$ and $\eta_4$ is derived.

$$\eta_3 = \eta_4 + \frac{2n}{\xi^2} \quad (24)$$

Using above two equations (23) and (24), equation (19-c) can be written as a quadratic equation in $\eta_2$:

$$(2+\delta)\zeta^4\frac{2n^2}{\xi^2}\left(1 + \frac{n\zeta^2(2+\delta)\eta_4 + (1+\delta)\lambda}{2n^2(2+\delta)\zeta^2}\xi^2\right)\eta_2^2 + \frac{n\zeta^2}{\xi^2}[(2+\delta)\lambda + 4n\zeta^2\eta_4] \times \quad (25)$$

-continued $$\left(1 + \frac{[(2+\delta)\lambda + 2n\zeta^2\eta_4]\zeta^2\eta_4 + 2(1+\delta)n}{n\zeta^2[(2+\delta)\lambda + 4n\zeta^2\eta_4]}\xi^2\right)\eta_2 +$$

$$\frac{2n\lambda\zeta^2\eta_4}{\xi^2}\left(1 + \frac{(2+\delta)n + \lambda\zeta^2\eta_4}{2n\lambda\zeta^2}\xi^2\right) = 0$$

The above equation (25), imposed with (22), can be solved and the solution gives two eigenvalues $\lambda$ which correspond to two modes, i.e., HE mode and EH mode.

The group velocity Vg, representing the propagation velocity of energy, can be represented as follows as well known;

$$V_g = c\left(\frac{d\beta}{dk}\right)^{-1} \tag{26}$$

where c is the light velocity in vacuum. Therefore a group delay produced with the propagation of light over a distance L through an optical fiber, $\tau_{gr}$, is written as, $$\tau_{gr} = \frac{L}{V_g} = \frac{L}{c}\left(\frac{d\beta}{dk}\right) \tag{27}$$

The propagation constant $\beta$ is derived from (9), (18) and (22) as, $$\beta^2 = \frac{1}{a^2}\left(\frac{\zeta^4}{\Delta} - \zeta^2\lambda\right) \tag{28}$$

$$= k^2\epsilon_1\left(1 - \Delta\frac{\lambda}{\zeta^2}\right)$$

Imposition of (28) into (27) with necessary variations will lead to the next equation, $$\tau_{gr} = \frac{L}{c}\frac{1 - \lambda\Delta/2\zeta^2 - (\Delta/2)d\lambda/d(\zeta^2)}{(1 - \lambda\Delta/\zeta^2)^{\frac{1}{2}}}\left(\epsilon_1^{\frac{1}{2}} + k\frac{d\epsilon_1^{\frac{1}{2}}}{dk}\right) \tag{29}$$

If we ignore the term of the order of $\Delta^2$ and the product of $\Delta$ with $k(d\epsilon_1^{\frac{1}{2}}/dk)$, we obtain $$\tau_{gr} = \frac{L}{c}\left(\frac{d(k\epsilon_1^{\frac{1}{2}})}{dk} - \frac{\epsilon_1^{\frac{1}{2}}\Delta}{2}\frac{d\lambda}{d(\zeta^2)}\right) \tag{30}$$

The first term of equation (30) characterizes the material dispersion; the second term represents the waveguide dispersion. The second term has different values for different guided modes, so that it may cause said mode-delay differences, namely differences in group delays among many modes on account of multimode dispersion.

To evaluate said mode-delay differences among many guided modes, normalized group delays $d\lambda/d(\xi^2)$ should be calculated for each mode.

Taking total differential of (19-a), the next equation will follow;

$$\left[2(1+\delta)\frac{\partial\eta_1\eta_2}{\partial(\zeta^2)} + (2+\delta)\eta_3\frac{\partial\eta_2}{\partial(\zeta^2)} + (2+\delta)\eta_4\frac{\partial\eta_1}{\partial(\zeta^2)}\right]d(\zeta^2) + \tag{31}$$

$$\left[2(1+\delta)\frac{\partial\eta_1\eta_2}{\partial\lambda} + (2+\delta)\eta_3\frac{\partial\eta_2}{\partial\lambda} + (2+\delta)\eta_4\frac{\partial\eta_1}{\partial\lambda}\right]d\lambda +$$

$$\left[(2+\delta)\frac{\partial\eta_3}{\partial\xi} + (2+\delta)\eta_1\frac{\partial\eta_4}{\partial\xi} + 2\frac{\partial\eta_3\eta_4}{\partial\xi}\right]d\xi = 0$$

Similarly, next equation (32) will be given, $$2\xi d\xi = \left[2\left(\frac{\Delta+\delta}{\Delta(1+\delta)}\right)\zeta^2 - \lambda\right]d(\zeta^2) - \zeta^2 d\lambda \tag{32}$$

Imposition of (32) into (31) with necessary variation will lead to next equation (33);

$$-\frac{d\lambda}{d(\zeta^2)} = \frac{A + C\frac{1}{2\xi}\left[2\frac{\Delta+\delta}{\Delta(1+\delta)}\zeta^2 - \lambda\right]}{B - C\frac{\zeta^2}{2\xi}} \tag{33}$$

where A, B and C are as follows;

$$A = [2(1+\delta)\eta_2 + (2+\delta)\eta_4]\frac{\partial\eta_1}{\partial(\zeta^2)} + [2(1+\delta)\eta_1 + (2+\delta)\eta_3]\frac{\partial\eta_2}{\partial(\zeta^2)},$$

$$B = [2(1+\delta)\eta_2 + (2+\delta)\eta_4]\frac{\partial\eta_1}{\partial\lambda} + [2(1+\delta)\eta_1 + (2+\delta)\eta_3]\frac{\partial\eta_2}{\partial\lambda},$$

$$C = [(2+\delta)\eta_2 + 2\eta_4]\frac{\partial\eta_3}{\partial\xi} + [(2+\delta)\eta_1 + 2\eta_3]\frac{\partial\eta_4}{\partial\xi}.$$

In the above equations, differentials $d\eta_1/d(\xi^2) \ldots d\eta_2/d\lambda$ are represented as follows, where differential formulae of Kummer function are used;

$$\frac{\partial\eta_1}{\partial(\zeta^2)} = \frac{1}{2\zeta^2}[1 - 2(n+1)\eta_1] + \frac{\lambda - \zeta^2}{2}\eta_1^2 \tag{34}$$

$$\frac{\partial\eta_2}{\partial(\zeta^2)} = \frac{1}{2\zeta^2}[1 + 2(n+1)\eta_2] + \frac{\lambda - \zeta^2}{2}\eta_2^2 \tag{35}$$

$$\frac{\partial\eta_1}{\partial\lambda} = \frac{\partial U_{1n\lambda}/\partial\lambda}{U_{1n\lambda}}\eta_1 - \frac{\zeta(\partial V_{1n\lambda}/\partial\lambda)}{U_{1n\lambda}}\eta_1^2 \tag{36}$$

$$\frac{\partial\eta_2}{\partial\lambda} = \frac{\partial U_{2n\lambda}/\partial\lambda}{U_{2n\lambda}}\eta_2 - \frac{\zeta(\partial V_{2n\lambda}/\partial\lambda)}{U_{2n\lambda}}\eta_2^2 \tag{37}$$

Figure 8A:
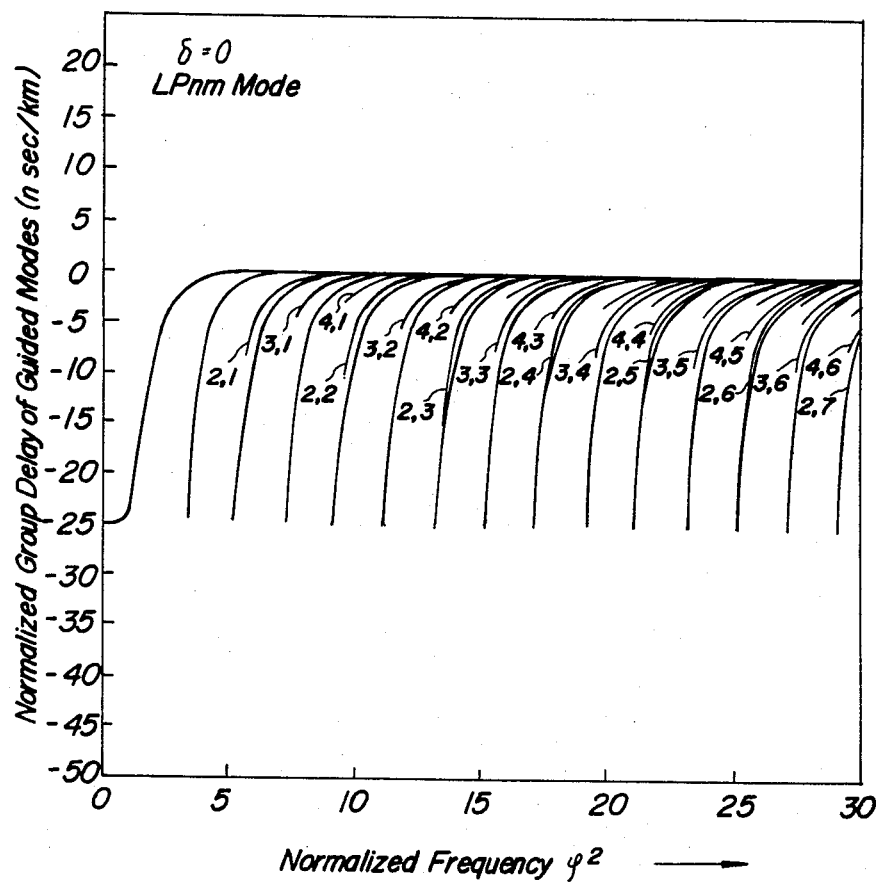
FIGS. 8(a), (b), (c) and (d) show characteristic diagrams of group delay characteristics resulted from numerical calculations by the present inventors.

FIGS. 8(a), (b), (c) and (d) show the results of numerical calculations by imposing eigenvalues $\lambda$ from (25) into said equation (33). In these figures the abscissa shows normalized frequencies $\xi^2$ and the ordinate shows group delays of guided modes $\iota_{gr}$ in a sec/km for $\epsilon_1 = 1.5$, $\Delta = 0.01$. These group delays $\tau_{gr}$ can be calculated from said equation (30), where the first term represented the material dispersion is assumed to be unity and the length of the optical fiber is assumed to be 1 km ($=10^3$ m). The light velocity in vacuum C is assumed to be $3 \times 10^8$ m/sec. In FIGS. 8(a), (b), (c) and (d) the guided modes are represented by so-called LPnm expression. The LPnm expression is described in an article by D. Gloge named "Weakly Guiding Fibers" in Applied Optics, Vol. 10, No. 10, October 1971, pp. 2252-2257. An LPl, m mode expresses a pair of degenerate modes, HE1+1, m mode and EH1−1, m mode in the case l≠1, while LP1, m represents a combination of HE2, m, TM 0m and TEom modes. HE1, m mode is represented by LP0m.

Figure 7B:
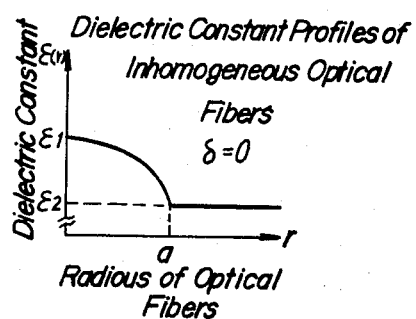
Figure 7C:
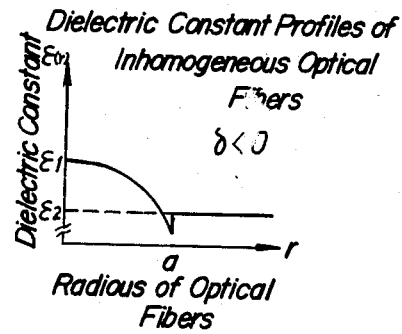
Figure 8B:
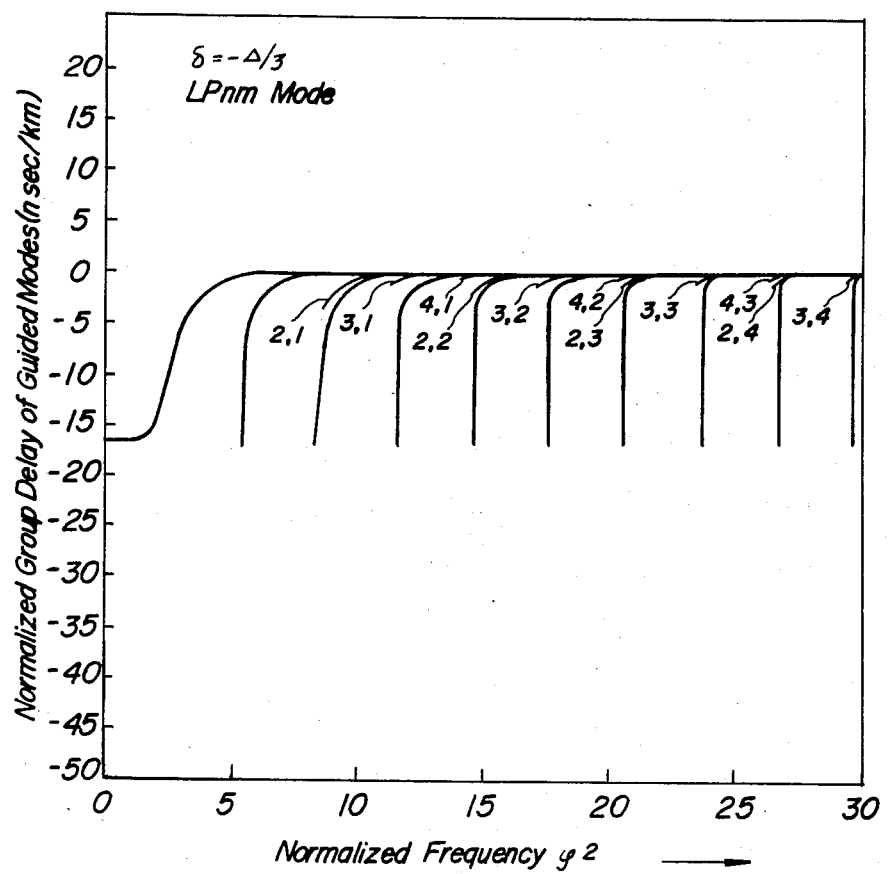

In FIG. 8(a), there is shown group delay characteristics of common graded index optical fiber having distribution of dielectric constant as shown in FIG. 7(b), ($\delta$=0). This FIG. 8(a) indicates relatively large mode-delay differences, which limit transmission bandwidth for higher order modes as well as for lower order modes. In FIGS. 8(b), (c) and (d), there are shown group delay characteristics of graded index optical fibers with a valley at the core-cladding boundary as shown in FIG. 7(c), where the constant $\delta$, representing the depth of the valley, is $-\Delta/3$, $-\Delta/2$ and $-2\Delta/3$, respectively.

Figure 1:
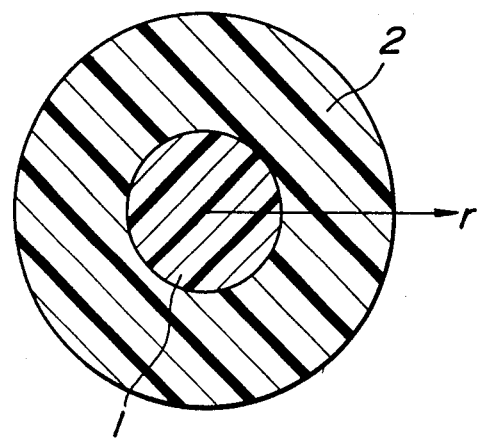
FIG. 1 is a cross-sectional view of an optical fiber used in a light transmitting system.
Figure 2:
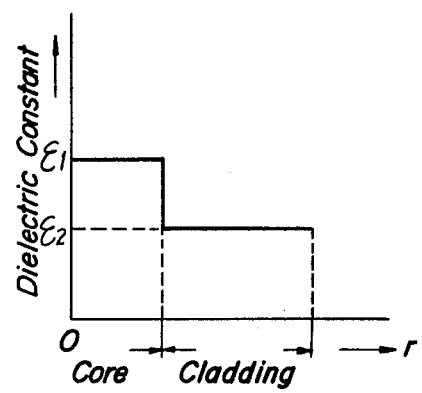
FIG. 2 shows a characteristic diagram of a distribution of dielectric constant in a direction of radius in a step index optical fiber having a uniform distribution in the core.
Figure 3:
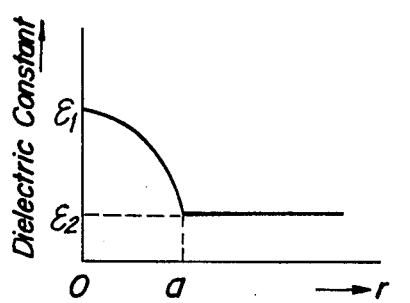
FIG. 3 shows a characteristic diagram of a distribution of dielectric constant in a graded index optical fiber having a continuously decreasing distribution of dielectric constant from the center along its radius in the core.
Figure 4:
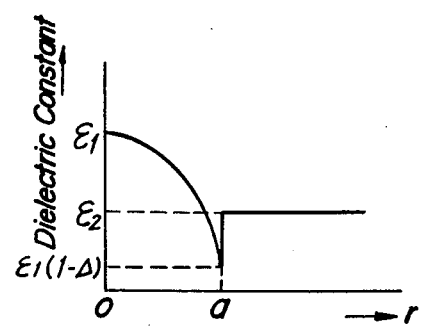
FIG. 4 shows a characteristic diagram of a distribution of dielectric constant in a graded index optical fiber with a valley at the core-cladding boundary.
Figure 5:
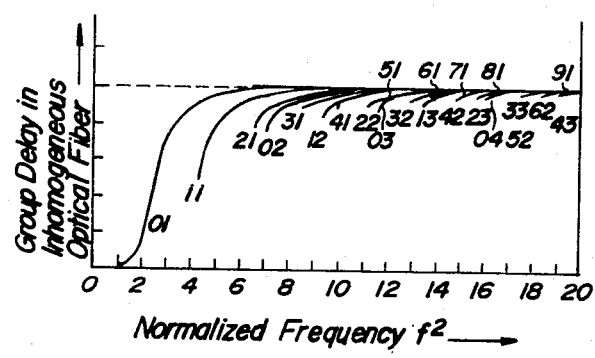
FIG. 5 is a known graph of group delay characteristics of a graded index fiber of FIG. 4.

It will be clear from a comparison of these FIGS. 8(b), (c) and (d) with FIG. 8(a) that the modedelay differences among modes of large azimuthal number such as two and more are small in the cases shown by FIGS. 8(b), (c) and (d). However, it should be recognized that the mode-delay differences among modes of small azimuthal numbers such as zero and one are larger than those of FIG. 5. This means that mode-delay differences, in fact, presents among mode of small azimuthal numbers even in such a graded index optical fiber with a valley at the core-cladding boundary. This will necessarily limit the transmission bandwidth.

The present invention is based on the above theoretical analysis. According to the present invention, there is provided a mode filter filtering out modes of small azimuthal number to eliminate such mode-delay differences so that light signals may be transmitted with a super wide bandwidth.

FIG. 9 is a schematic diagram showing an embodiment of a device for the light transmission system according to the present invention. In FIG. 9 a laser 10 emits a laser beam of $TEM_{00}$ mode. The emitted laser beam is increased in its diameter and is collimated through an expander 11 comprising, for example, a lens. The expanded laser beam is passed through a mode filter 12 and then the beam is reconverged into a narrow beam through a converging lens 13. The converged beam is inputted into an input of said graded index optical fiber 14 with a valley at the corecladding boundary.

FIG. 10 exhibits an embodiment of said mode filter 12. Aperture 21A–21D are provided on a metal plate 20 polished in flat plane. These apertures are shaped in quadratic circle. Apertures 21A and 21C positioned oppositely on a diagonal are covered with glass plates 23A and 23C, respectively, having a given equal thickness to change the phase of the portion of the beam passing through apertures 21A and 21C by being precisely polished. Although it is desirable that these glass plates 23A and 23C should have precisely equal and accurate thicknesses, it is possible to use glass plates having unequal thicknesses. In this case, glass plates 23A and 23C are not placed in parallel to the metal plate 20 but are tilted against this metal plate 20 so as to equate optical path lengths. When the unbalance of absorption by the glass plates 23A and 23C causes trouble, there is provided another metal plate 24 having apertures 25A–25D of quadratic circle as shown in FIG. 11. If the apertures 25B and 25D of the metal plate 24 which correspond to apertures 21B and 21D of the metal plate 20 are covered with glass plates 26B and 26D, respectively, there is provided a correcting filter which corrects said unbalance of absorption caused by lacking of glass plates on the apertures 21B and 21D.

The mode filter 12 shown in FIG. 10 can convert guided modes of zero-th order into those of higher order. Such a mode filter can convert $TEM_{00}$ wave emitted from the laser 10 into waves of higher order mode by changing its phase without absorption. Therefore, substantially no loss of energy can be enjoyed.

FIG. 12 shows another embodiment of a mode filter 12 for converting guided modes of zero-th order into those of higher order. There are provided six apertures 31A–31F of one-sixth circle on a metal plate 30. The apertures 31B, 31D and 31F are covered with glass plates having precisely equal thicknesses 32B, 32D and 32F, respectively.

It should here be noted in FIG. 9 that the expander 11 and the converging lens 13 can be omitted if the mode filter 12 is constructed sufficiently small.

Figure 8C:
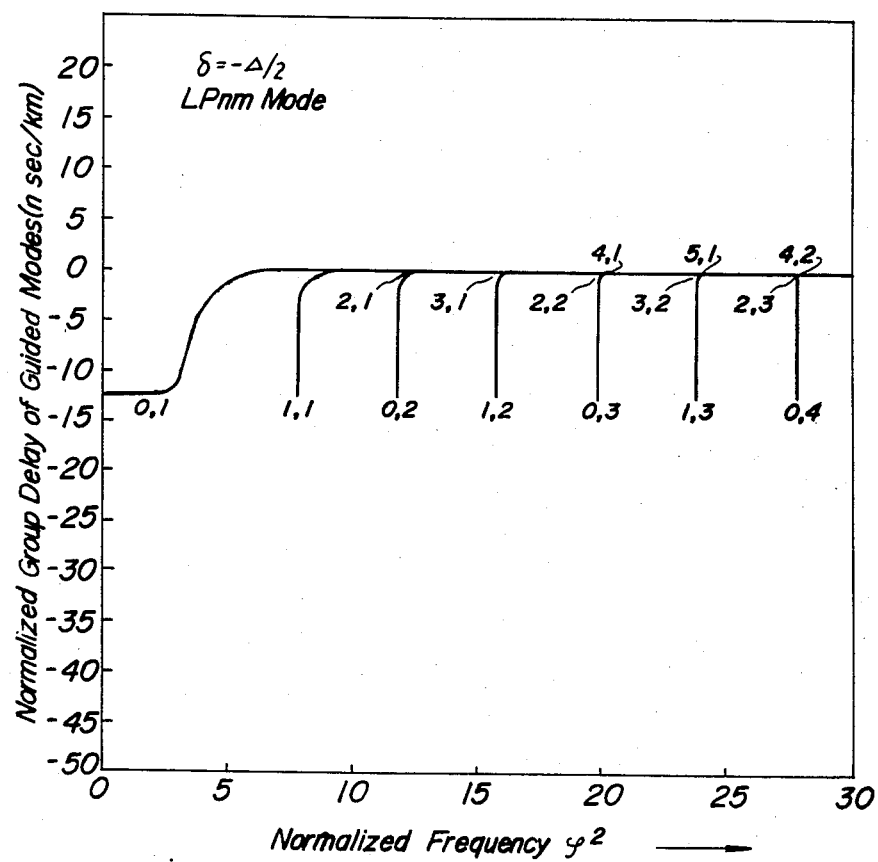
Figure 8D:
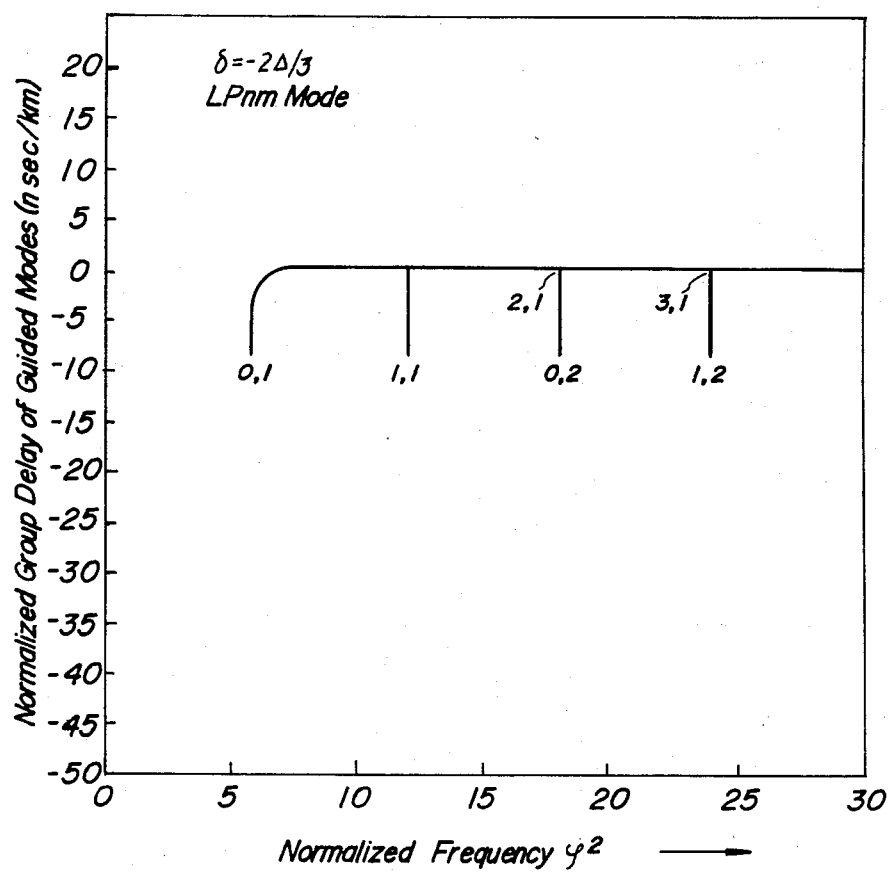

In FIG. 13 there is shown a graph of standard deviation of group delays SD plotted against a normalized frequency $S^2$ in the case where a mode filter shown in FIG. 10 which can convert guided modes of zero-th order into those of higher order is used in combination with a graded index optical fiber with a valley at the core-cladding boundary having group-delay characteristics as shown in FIG. 8(c). It can be seen from FIG. 13 that the standard deviation SD is below $4 \times 10^{-2}$ nsec/km which is smaller than the case without the mode filter 10 by more than $1/10^3$. Therefore according to the present invention there is provided an optical fiber the bandwidth of which is broader than that of a conventional optical fiber by a thousand times. Normally the bandwidth of conventional optical fibers lies in the order of $GH_z$, so that there will be obtained, according to the present invention, optical fibers having bandwidth of order of thousand giga hertz.

The above described embodiments are merely examples. Those skilled in the art can conceive various modifications and variations without departing from the scope of the invention. For example, although the described mode filters change the phase discontinuously from zero to $\pi$ to zero, mode filters may be employed which change the phase continuously.

What is claimed is:

1. A super wide bandwidth light transmitting system, comprising:
    (a) a laser for producing $TEM_{00}$ waves;
    (b) at least one graded index optical fiber including a core having a dielectric constant which continuously decreases from its center along its radius, and a cladding having a uniform dielectric constant larger than that of the core at the interface between the core and the cladding;
    (c) an optical input to said graded index optical fiber, and
    (d) a mode filter disposed between said laser and said optical input for increasing the bandwidth of the system by eliminating waves of the modes with lower azimuthal numbers which produce a large amount of dispersion-type signal distortion at frequencies close to a cutoff frequency of the system.

2. A light transmitting system as claimed in claim 1 characterized in that said mode filter comprises a metal plate having four quadrant-shaped apertures arranged in a circular configuration, and glass plates of the same thickness which cover two of said apertures which are located opposite to one another on a diagonal.

3. A light transmitting system as claimed in claim 1 characterized in that said mode filter comprises a metal plate having six apertures of one-sixth circle each, and glass plates of the same thickness which cover every other aperture.

4. A light transmitting system as claimed in claim 2 or 3 further including a correcting filter for correcting the differences in absorption of the $TEM_{00}$ waves caused by said glass plates, said correcting filter comprising a metal plate having apertures registering with said apertures of said mode filter, and glass plates which cover the apertures in the correcting filter which correspond to the apertures of the mode filter which lack glass plates.

5. A light transmitting system using a graded index optical fiber including a core having a dielectric constant continuously decreasing from its center along its radius, and a cladding having a uniform dielectric constant larger than that of the core as its interface with the cladding, comprising:
(a) a mode filter provided between a laser producing $TEM_{00}$ waves and an input of said fiber for eliminating waves of the modes with lower azimuthal numbers which produce large dispersion at a frequency close to the cutoff frequency of the system, wherein said filter includes a metal plate having a plurality of apertures, and a plurality of glass plates for covering some but not all of said apertures, and
(b) a correcting filter for correcting the difference in absorbtion of said $TEM_{00}$ waves caused by said glass plates, said correcting filter comprising a metal plate with registering apertures corresponding to said apertures of said mode filter and having glass plates located in said registering apertures where the corresponding apertures of said mode filter lack glass plates, whereby said light transmitting system eliminates mode-delay differences so as to have a super wide bandwidth.

* * * * *